United States Patent [19]

Bashaw, III

[11] Patent Number: 5,253,970
[45] Date of Patent: Oct. 19, 1993

[54] ROUND HAY BALE DISPENSER

[76] Inventor: William L. Bashaw, III, Rte. 1, Box 277, Goshen, Va. 24439

[21] Appl. No.: 929,129

[22] Filed: Aug. 13, 1992

[51] Int. Cl.⁵ .................................................. A01D 90/12
[52] U.S. Cl. .................................. 414/24.6; 414/911; 414/920
[58] Field of Search .............. 414/24.5, 24.6, 25, 414/437–438, 911, 920; 241/101.7

[56] References Cited

U.S. PATENT DOCUMENTS

| | | | |
|---|---|---|---|
| 3,779,208 | 12/1973 | Gay | 414/24.6 |
| 3,861,616 | 1/1975 | Dubberke | 414/24.6 |
| 3,908,846 | 9/1975 | Brummitt | 414/24.6 |
| 3,958,772 | 5/1976 | Hynson | 414/24.6 X |
| 3,997,069 | 12/1976 | McCanse et al. | 414/24.6 |
| 4,113,116 | 9/1978 | Brandt | 414/24.6 |
| 4,280,777 | 7/1981 | Gray | 414/24.6 |
| 4,390,312 | 6/1983 | Skeem | 414/24.6 |
| 4,396,331 | 8/1983 | Forster | 414/24.6 |
| 4,411,573 | 10/1983 | Townsend | 414/24.6 |
| 4,413,940 | 11/1983 | Southard et al. | 414/911 X |
| 4,632,619 | 12/1986 | Kennedy | 414/24.6 |
| 4,687,402 | 8/1987 | Zatylny | 414/24.6 |
| 4,968,205 | 11/1990 | Biasotto et al. | 414/24.6 |

FOREIGN PATENT DOCUMENTS

| | | | |
|---|---|---|---|
| 1028654 | 3/1978 | Canada | 414/24.6 |
| 3614234 | 11/1986 | Fed. Rep. of Germany | 414/24.6 |
| 2565766 | 12/1985 | France | 414/24.6 |
| 2048211 | 12/1980 | United Kingdom | 414/24.6 |

Primary Examiner—Frank E. Werner
Assistant Examiner—James Keenan
Attorney, Agent, or Firm—Brady, O'Boyle & Gates

[57] ABSTRACT

A round hay bale dispenser connectable to the conventional three-point hitch of a tractor and having a pair of spaced longitudinally extending arms movable simultaneously laterally relative to each other for accommodating a round hay bale therebetween. A freely rotatable wheel is mounted on the free or outer end of each arm and engages the outer peripheral surface of the bale. The tractor pulls the arms causing the bale to roll as it traverses the ground while the wheels engage the outer surface of the bale causing the hay to fall from the bale in chunks rather than layers.

5 Claims, 4 Drawing Sheets

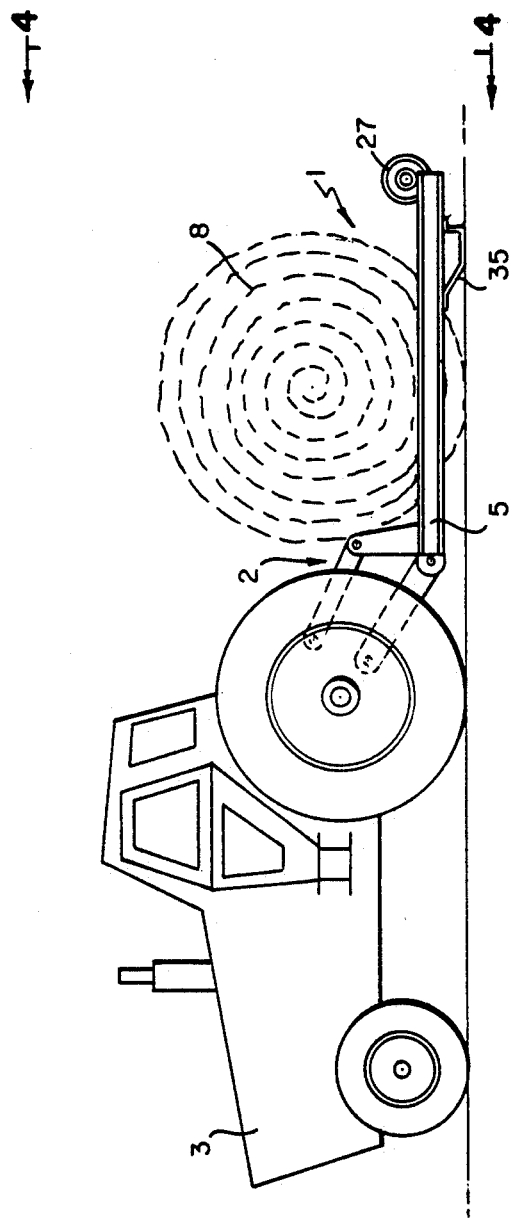
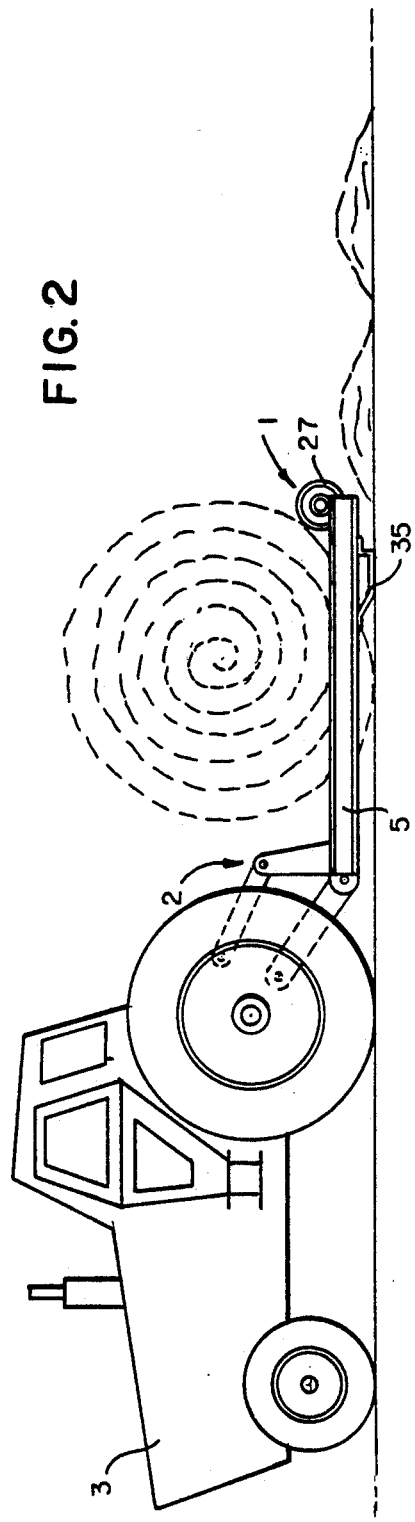

FIG. 3
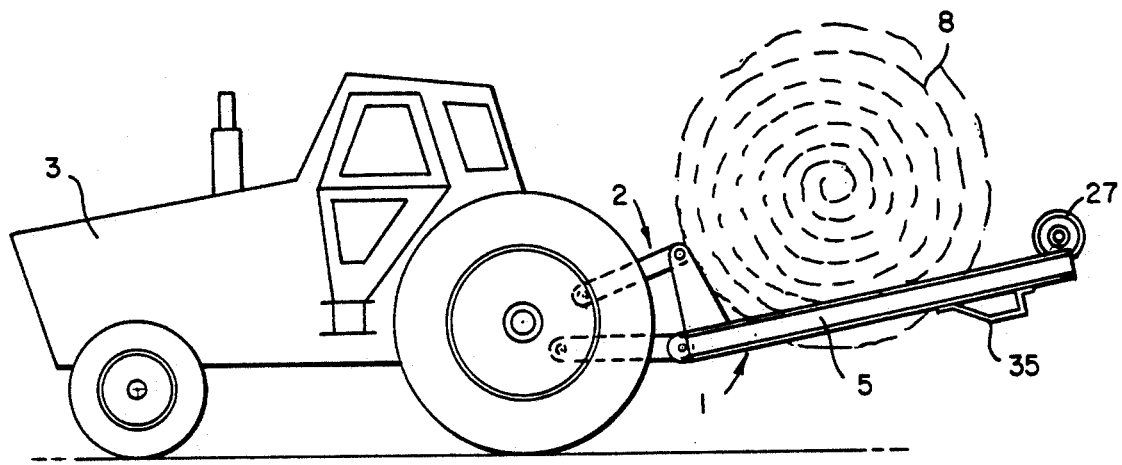
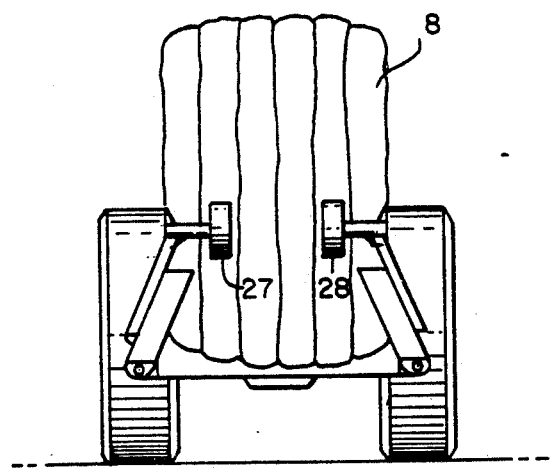
FIG. 4

FIG. 8
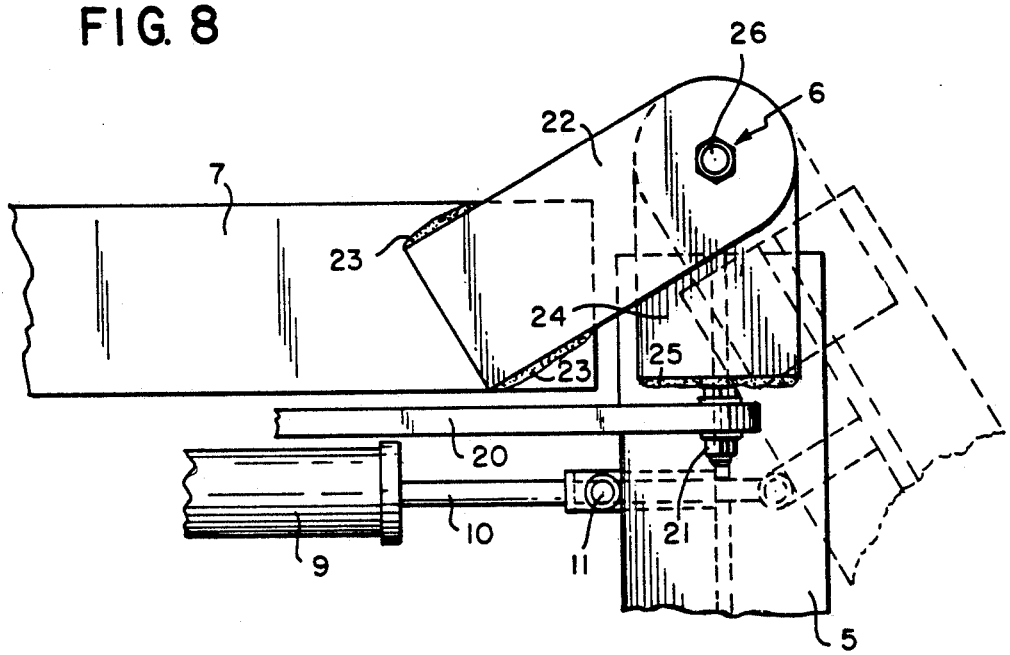
FIG. 9
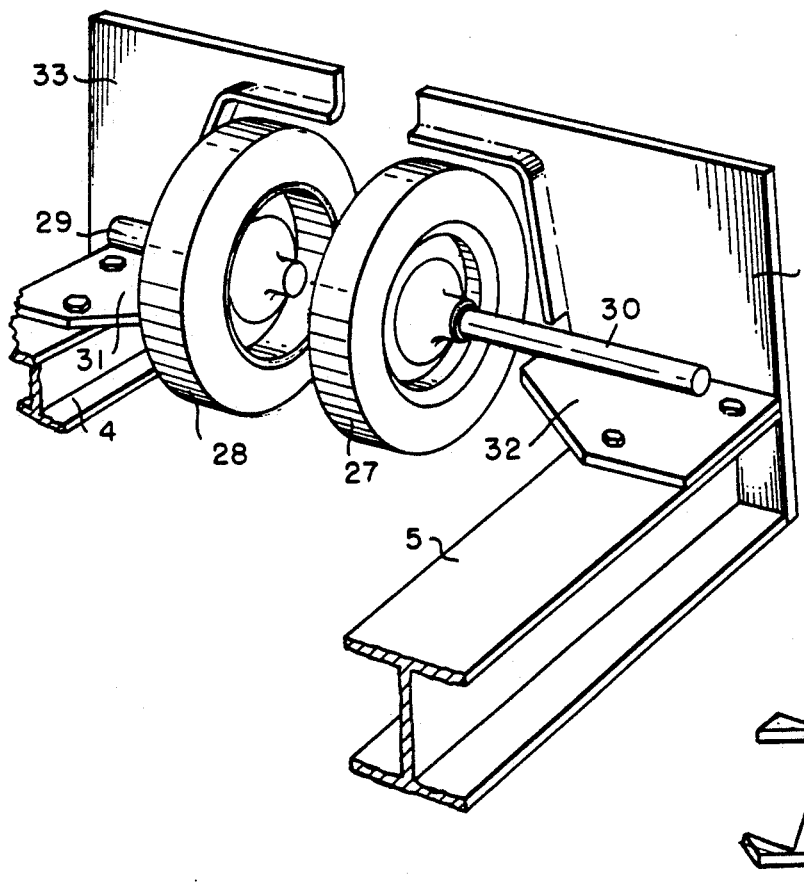
FIG. 10

ROUND HAY BALE DISPENSER

BACKGROUND OF THE INVENTION

Various apparatuses have been proposed for dispensing hay from a rolled bale. U.S. Pat. Nos. 3,908,846; 4,113,116; and 4,687,402, disclose the conventional rolled hay bale dispenser wherein the round bale is held between a pair of laterally adjustable arms connected to the trailer hitch of a tractor. As the bale is held by the arms and towed by the tractor, the bale rolls on the ground and the hay is unwound therefrom and dispensed to the ground in sheet layers.

U.S. Pat. Nos. 3,779,208 and 4,632,619 disclose round hay bale dispensers wherein a roller or wheel is connected to a vehicle which pushes the round hay bale. The roller or wheel engaging the peripheral surface of the round hay bale causes the hay to be dispensed therefrom onto the ground in layers.

It has been found that when the hay is dispensed from the round bale and is deposited on the ground in layers, much of the hay is wasted due to the fact that the livestock only eats a portion of the layer of hay.

After considerable research and experimentation, the round hay bale dispenser of the present invention has been constructed and arranged to dispense the hay therefrom in the form of chunks rather than sheet layers, whereby the livestock find the hay more palatable, resulting in less wastage.

SUMMARY OF THE INVENTION

The round hay bale dispenser of the present invention comprises, essentially, a pair of spaced, longitudinally extending arms pivotally connected to opposite ends of a transversely extending main frame connected to the conventional three point hitch of a tractor. A hydraulic cylinder and suitable linkage are operatively connected to the arms for simultaneously moving the arms laterally, to thereby vary the space therebetween. The free or outer end of each arm is provided with a freely rotatable wheel extending inwardly into the space between the arms. By this construction and arrangement, the arms are spread to accommodate a round bale and then moved inwardly toward each other to grip the bale. The arms are lowered so the bale engages the ground and the wheels engage the outer peripheral surface of the bale. The tractor pulls the frame and attached arms causing the bale to roll as it traverses the ground. During the rolling of the hay bale, the wheels engage the outer surface thereof, causing the hay to fall from the bale in chunks rather than layers.

BRIEF DESCRIPTION OF THE DRAWINGS

FIG. 1 is a side elevational view of the round hay bale dispenser of the present invention connected to a tractor preparatory to the dispensing of the hay;

FIG. 2 is a side elevational view of the dispenser rollers engaging the bale and dispensing chunks therefrom;

FIG. 3 is a side elevational view of the dispenser in the elevated position for transporting a bale of hay;

FIG. 4 is an end elevational view of the dispenser shown in FIG. 3;

FIG. 8 is a fragmentary top plan view showing the connection of the hydraulic cylinder and associated linkage connected to one of the dispenser arms;

FIG. 9 is a fragmentary perspective view showing the details of the dispenser rollers and deflector plates; and FIG. 10 is an end view showing the torsional deflection of one of the dispenser arms.

DESCRIPTION OF THE PREFERRED EMBODIMENT

Figure 5:
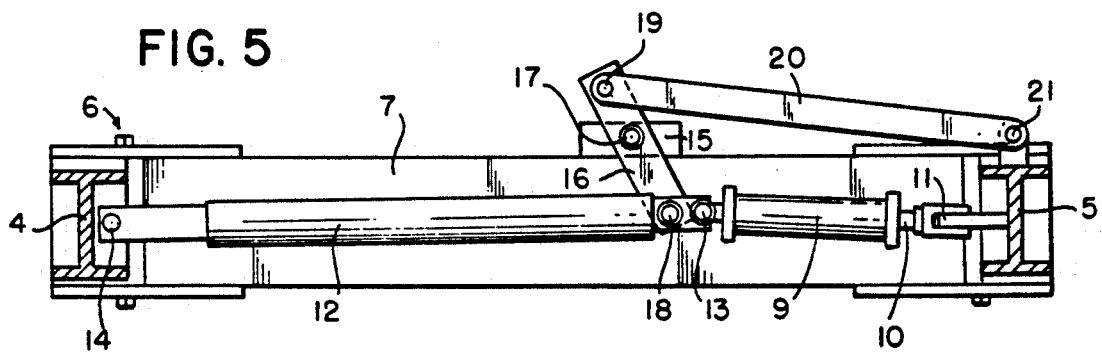
FIGS. 5, 6 and 7 are end elevational views, partly in section, showing the various positions of the dispenser arms and associated hydraulic cylinder and linkage when the arms are convergent, parallel and divergent, respectively.

Referring to the drawings and more particularly to FIGS. 1, 2, 3 and 4, the round hay bale dispenser 1 of the present invention is adapted to be connected to the conventional three-point hitch 2 of the tractor 3.

As will be seen in FIGS. 1 to 3 and 5, the dispenser 1 comprises a pair of laterally spaced, longitudinally extending arms 4 and 5 pivotally connected as at 6 to opposite ends of a transversely extending main frame 7 which is connected to the conventional three-point hitch 2 of the tractor 3.

Figure 6:
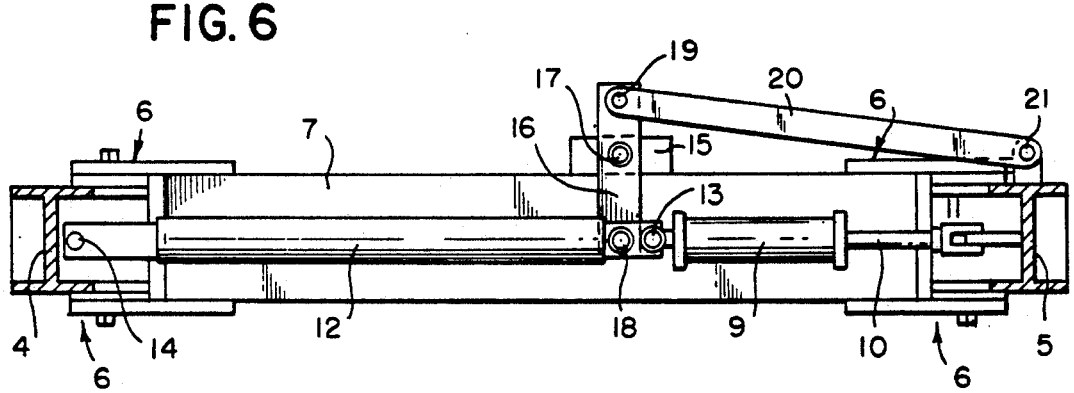
Figure 7:
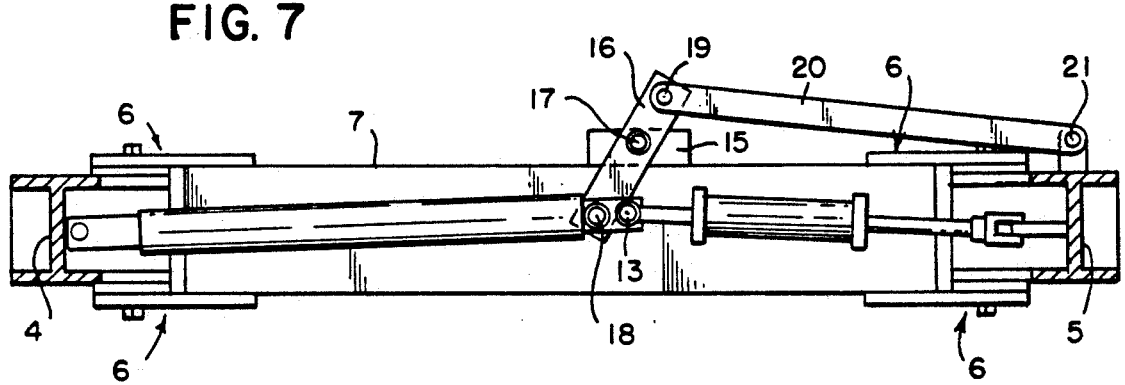

The arms 4 and 5 are adapted to be pivoted simultaneously in a direction toward each other, as shown in Figure 5, parallel to each other, as shown in FIG. 6, and away from each other, as shown in FIG. 7, to thereby vary the space between the arms 4 and 5 to accommodate a round bale of hay 8, as shown in FIG. 4, for holding the bale during the transportation thereof, as shown in FIG. 3, or while dispensing the hay, as shown in FIG. 2, to be described more fully hereinafter, the arms being H-beams providing strength and flexibility. During transport, they have a very positive grip without doing damage to the round bale.

The apparatus for pivoting the arms 4 and 5 simultaneously relative to each other comprises a hydraulic cylinder 9 having its piston rod end 10 pivotally connected to the arm 5 as at 11. The hydraulic cylinder 9 is pivotally connected to one end of a rod 12, as at 13, the opposite end of the rod 12 being pivotally connected to the arm 4 as at 14. A fixed bracket 15 is secured to the frame 7, and a link 16 is pivotally connected to the bracket as at 17. One end of the link 16 is pivotally connected to the rod 12 as at 18 and the opposite end of the link 16 is pivotally connected as at 19 to one end of a connecting rod 20, the opposite end of the connecting rod 20 being pivotally connected to the arm 5 as at 21.

The details of the construction of each of the pivots 6 are illustrated in FIG. 8 wherein it will be seen that a plate 22 is welded as at 23 to the end portion of the main frame 7 and extends forwardly and obliquely therefrom. Another plate 24 is welded as at 25 to the arms 5 and extends axially from the front of the arm 5 and underlies the plate 22. A suitable anti-friction washer, not shown, is positioned between the overlapping plates 22 and 24 and a pivot pin 26 extends through the plates 22 and 24. By the construction and arrangement of the plates 22 and 24, a reinforced, offset pivot is provided to thereby resist the twisting of the arms 4 and 5, as illustrated in FIG. 10, during the operation of the dispenser.

To complete the construction of the dispenser, a pair of wheels 27, 28 are mounted on the outer or free ends of the arms 4 and 5 and extend inwardly into the space between the arms. The wheels are freely rotatable on axles 29 and 30 fixedly mounted on plates 31 and 32 secured to the arms 4 and 5. Deflector plates 33 and 34 are also secured to the outer ends of the arms 4 and 5 adjacent the wheels 27 and 28, and a ground-engaging skid 35 is secured to the lower surface of each arm 4 and 5, as shown in FIGS. 1 and 2.

In the operation of the round hay bale dispenser of the present invention, the arms 4 and 5 are initially spread, and the tractor 3 is backed up to a round hay bale 8 as shown in FIGS. 1 and 2. The arms 4 and 5 are then moved together to grip the round hay bale 8, and the arms 4 and 5 are lifted by the three-point hitch 2 of the tractor and the gripped hay bale is transported to a desired grazing field, as shown in FIG. 3.

When it is desired to dispense the hay, the arms 4 and 5 are lowered until the skids 35 engage the ground, and the arms 4 and 5 are then spread slightly to guide the hay bale 8 while allowing it to roll on the ground. The tractor 3 is then moved forwardly to cause the wheels 27 and 28 to engage the peripheral surface of the hay bale 8 as shown in FIG. 2. Continued forward movement of the tractor 3 causes the hay bale 8 to roll on the ground, while the free wheeling wheels 27 and 28 engage the outer peripheral surface of the hay bale causing the hay to fall therefrom in chunks. To prevent long stemmed hay from piling up on the wheels 27, 28, the deflector plates 33 and 34 are provided which scrape the hay from the wheels, and the ground-engaging skids 35 maintain the freely rotating wheels at the correct height for dispensing hay from the bale 8.

From the above description, it will be readily apparent to those skilled in the art that the round bale hay dispenser of the present invention is an improvement over prior hay dispensers since the rollers 27, 28 on the arms 4 and 5 engage the peripheral surface of the hay bale to cause the hay to fall therefrom in chunks, rather than in a layer, to thereby provide a more palatable hay for the livestock while reducing the amount of wastage.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A round hay bale dispenser comprising a transversely extending main frame adapted to be connected to a conventional three-point hitch on a tractor, a pair of spaced, longitudinally extending arm, means for pivotally connecting the forward end of each arm to a respective end of said transversely extending main frame, power means operatively connected between said main frame and said arms for moving said arms simultaneously laterally relative to each other to vary the space therebetween, a round bale of hay supported on the ground and positioned in the space between said arms to be guided thereby, said arms having a cross-sectional configuration permitting sliding and frictional engagement with said round bale of hay substantially below a transverse axis, and a freely rotatable wheel mounted on the opposite end of each arm and extending inwardly into the space between the arms, said wheels frictionally engaging the peripheral surface of the hay bale at opposite end portions thereof when the tractor pulls the arms causing the hay bale to roll on the ground about an axis transverse to a longitudinal axis, whereby the frictional engagement of the freely rotatable wheels with the opposite end portions of the bale cause the hay to be pulled from the bale and fall on the ground in chunks, rather than layers, thereby making the hay more palatable for livestock to be fed.

2. A round hay bale dispenser according to claim 1, wherein 1 the means for pivotally connecting the forward end of each arm to a respective end of the transversely extending main frame comprise, a first plate integrally connected to an end portion of the main frame and extending forwardly and obliquely therefrom, a second plate integrally connected to the arm and extending axially from the front thereof, said first plate being superposed over the second plate, and a pivot pin extending through said plates, whereby a reinforced, offset pivot is provided to resist twisting of the arms about their longitudinal axes during the operation of the dispenser.

3. A round hay bale dispenser according to claim 1, wherein the power means for pivoting the arms laterally relative to each other comprises, a hydraulic cylinder having its piston rod end pivotally connected to one of the arms, a rod, one end of said rod being pivotally connected to the other arm, the opposite end of said rod being pivotally connected to the hydraulic cylinder, a fixed bracket secured to the transversely extending main frame, a link pivotally connected to said bracket at a location between the ends of said link, one end of said link being pivotally connected to the opposite end portion of said rod, and a connecting rod, one end of said connecting rod being pivotally connected to the opposite end of said link, the opposite end of said connecting rod being pivotally connected to said one of the arms, whereby upon actuation of the hydraulic cylinder the arms are pivoted laterally simultaneously relative to each other.

4. A round hay bale dispenser according to claim 1, wherein deflector plates are secured to the ends of the arms adjacent the wheels to prevent hay from piling up on the wheels during the dispensing of the hay from the bale.

5. A round hay bale dispenser according to claim 1, wherein a skid is mounted on the lower surface of each arm to support the arm on the ground.

* * * * *